United States Patent Office 2,821,563
Patented Jan. 28, 1958

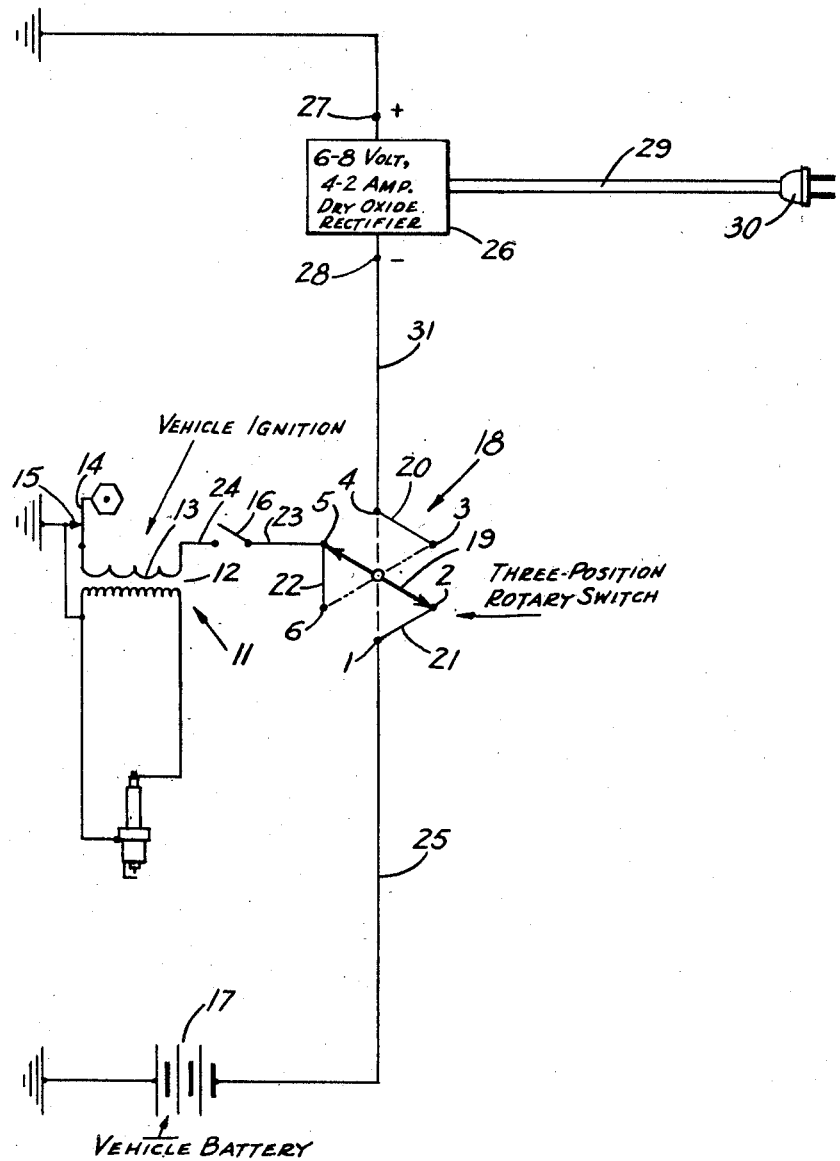

2,821,563
COLD WEATHER STARTING DEVICE FOR MOTOR VEHICLES

Grover L. Roberts and Emil C. Petersen, Anchorage, Territory of Alaska; said Petersen assignor to said Roberts Application March 29, 1955, Serial No. 497,782

4 Claims. (Cl. 123—148)

This invention relates to starting devices for motor vehicles, and more particularly to booster means for energizing the ignition circuit of a motor vehicle independently of the vehicle battery to aid in starting the vehicle engine under adverse weather conditions, such as in very cold weather.

A main object of the invention is to provide a novel and improved device for use with a motor vehicle of the type having a storage battery and an ignition circuit, wherein the storage battery is employed for starting the engine and for normally energizing the ignition circuit, the device being arranged to provide either a normal connection of the battery to the ignition circuit, or to provide independent energization of the ignition circuit for cold weather starting, the improved device involving simple components, being easy to install, and greatly facilitating the starting of the vehicle engine under adverse weather conditions.

A further object of the invention is to provide an improved device for use in starting an automobile engine in cold weather, said device involving relatively few parts, being very inexpensive to manufacture, and being arranged to provide either a normal connection of the vehicle battery to the ignition circuit of the vehicle, energization of the ignition circuit of the vehicle independently of the vehicle battery for cold weather starting, or charging of the vehicle battery without connection to the ignition circuit of the vehicle.

Further objects and advantages of the invention will become apparent from the following description and claims, and from the accompanying drawings, in which the single figure diagrammatically illustrates an improved device according to the present invention and illustrating the connections of the device to the ignition circuit and the storage battery of a motor vehicle with which the device is employed.

Referring to the drawing, 11 generally designates the ignition circuit of a motor vehicle, said circuit including the ignition coil 12 which has the primary winding 13 and which includes the breaker points 14 and 15 connected in circuit with said primary winding 13. Also connected in circuit with the primary winding 13 is the vehicle ignition switch 16.

Designated at 17 is the vehicle storage battery, which ordinarily is employed to energize the ignition circuit and also is employed to energize the starting motor of the vehicle when the engine is to be started. As is well understood, one of the main reasons which makes it difficult to start a vehicle engine, especially in cold weather, is due to the fact that the starting motor imposes such a considerable drain on the storage battery that the battery voltage is substantially lowered, whereby the lowered battery voltage produces a relatively small flow of current in the primary winding of the ignition coil, in turn resulting in a weak secondary voltage in the coil and relatively weak sparking at the spark plugs of the engine.

In accordance with the present invention, the motor vehicle is provided with a multiple position rotary switch, designated generally at 18, for example, a single pole, three-position rotary switch having six stationary contacts spaced around the axis of rotation of the pole 19 of the switch, said contacts being numbered 1 to 6, as shown in the drawing. In the first position of the switch 18, the pole 19 bridges the contacts 2 and 5, as shown in full line view in the drawing. In a second position of the switch pole, the pole 19 bridges the contacts 1 and 4, and in a third position of the switch pole, the switch pole bridges the contacts 3 and 6. The rotary switch 18 is mounted in any convenient location on the vehicle, for example on the vehicle dashboard.

The contacts 3 and 4 are electrically connected together, as by a conductor 20, the contacts 1 and 2 are electrically connected as by a conductor 21, and the contacts 5 and 6 are electrically connected together, as by a conductor 22. The contact 5 is connected to one terminal of the ignition switch 16, as by a conductor 23. The other terminal of the ignition switch is connected to the ignition coil primary 13, as by a conductor 24. The contact 1 is connected by a conductor 25 to the ungrounded terminal of the storage battery 17.

Designated at 26 is a conventional alternating current-energized rectifier having the output terminals 27 and 28, the rectifier 26 being mounted in any convenient location on the motor vehicle, or if so desired, being external to the motor vehicle and being provided with means for connecting the rectifier to the remainder of the circuit of the device, as will be presently explained.

The rectifier 26 is of the usual type provided with a line cord 29 adapted to be connected to a suitable alternating current supply line, such as a household supply line and being provided with a plug 30 for this purpose. The rectifier unit 26 provides a rectified output voltage at the terminals 27 and 28 thereof which is slightly higher than the voltage of the storage battery 17 of the motor vehicle, so that it may be employed at times for charging the vehicle battery, and at other times for providing the vehicle ignition current, as will be presently explained.

The terminal 27 of the rectifier is connected to the vehicle ground, being the same in polarity as the grounded terminal of the vehicle storage batery 17. The terminal 28 is connected by a conductor 31 to the stationary contact 4 of the rotary switch 18.

In the first position of the pole 19 of rotary switch 18, shown in full line view of the drawing, the pole bridges the contacts 2 and 5, connecting the ignition circuit 11 to the vehicle battery 17 in the normal manner, without connection to the rectifier 26. When it is desired to provide energization of the ignition circuit independently of the vehicle battery, such as for cold weather starting, the pole 19 is rotated to a second position wherein it bridges the contacts 6 and 3, whereby the output of the rectifier 26 is connected through conductor 31, conductor 20, pole 19, conductor 22, and conductor 23 to the ignition circuit, providing energization of the ignition circuit independently of the battery 17. Since the rectifier 26 is energized from an alternating current outside supply source, adequate energization of the ignition circuit is provided for cold weather starting.

The pole 19 of the switch 18 may be rotated to a third position wherein the pole 19 bridges the contacts 1 and 4, connecting the output of the rectifier to the vehicle battery 17 for charging the battery. In said third position, the battery 17 is disconnected from the ignition circuit 11 and may be charged independently of said ignition circuit.

From the above description, it will be apparent that by the use of the three-position rotary switch 18, the ignition circuit may be energized independently of the battery 17 for cold weather starting, whereby the reduction of voltage of the battery caused by the heavy load imposed thereon by the vehicle starting motor cannot affect the operation of the ignition circuit, and whereby the ignition circuit is energized from an adequate source independent of the battery, facilitating the starting of the engine. After the engine has been started, the switch pole 19 may be rotated to the full line position thereof, bridging the contacts 5 and 2, whereby the ignition circuit is connected in the normal manner to the vehicle battery and the battery is disconnected from the rectifier 26. After the engine has been started, the plug 30 of the rectifier line cord 29 is disconnected from the external alternating current supply source so that the vehicle may proceed. During the time in which the vehicle is garaged, the rectifier 26 may be energized and the rotary switch 18 may be set to connect the output of the rectifier to the vehicle storage battery 17, as by rotating the pole 19 to the position wherein it bridges the contacts 1 and 4, enabling the battery to be charged while the vehicle is garaged.

While a specific embodiment of an improved device for facilitating the starting of a motor vehicle in cold weather has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device for use with a motor vehicle having a storage battery and an ignition circuit wherein the storage battery is employed for starting the engine and for normally energizing the ignition circuit, said device comprising an alternating current-energized rectifier having a rectified output voltage slightly higher than the voltage of the storage battery, and a multiple-position switch connected between the rectifier, the ignition circuit and the battery, said switch having at least three operative positions and being formed and arranged so that in a first position it provides a normal connection of the battery to the ignition circuit without connection to the rectifier, in a second position it connects the output of the rectifier to the ignition circuit without connection to the battery, to provide adequate energization of the ignition circuit for cold weather starting, and in a third position it connects the rectifier output to the battery without connection to the ignition circuit, for charging the battery.

2. A device for use with a motor vehicle having a storage battery and an ignition circuit wherein the storage battery is employed for starting the engine and for normally energizing the ignition circuit, said device comprising an alternating current-energized rectifier having a rectified output voltage slightly higher than the voltage of the storage battery, and a single pole, three-position rotary switch connected between the rectifier, the ignition circuit and the battery, said switch being formed and arranged so that in a first position it provides a normal connection of the battery to the ignition circuit without connection to the rectifier, in a second position it connects the output of the rectifier to the ignition circuit without connection to the battery, to provide adequate energization of the ignition circuit for cold weather starting, and in a third position it connects the rectifier output to the battery without connection to the ignition circuit, for charging the battery.

3. A device for use with a motor vehicle having a storage battery, an engine, and an ignition circuit, wherein the storage battery is employed for starting the engine and for normally energizing the ignition circuit, said device comprising an alternating current-energized rectifier having a rectified output voltage slightly higher than the voltage of the storage battery, a switch having a rotary pole and contacts spaced around the axis of said pole, means electrically connecting a first pair of successive contacts together, means electrically connecting a second pair of successive contacts together, and means electrically connecting a third pair of successive contacts together, means electrically connecting said third pair of contacts to the ignition circuit and the second pair of contacts to the battery, said pole in a first position being formed and arranged to bridge said third and second pair of contacts to energize the ignition circuit from the battery, and means electrically connecting said first pair of contacts to the output of the rectifier, said pole in a second position being formed and arranged to bridge said first and third pair of contacts to energize the ignition circuit from the output of the rectifier, said pole in a third position being formed and arranged to bridge said first and second pair of contacts, to charge the battery from the rectifier.

4. A device for use with a motor vehicle having an engine, a storage battery, and an ignition circuit, wherein the storage battery is employed for starting the engine and for normally energizing the ignition circuit, said device comprising an alternating current-energized rectifier having a rectified output voltage slightly higher than the voltage of the storage battery, a switch having a rotary pole and six contacts spaced sequentially around the axis of said pole, means electrically connecting a first pair of successive contacts together, means electrically connecting a second pair of successive contacts together, means electrically connecting a third pair of successive contacts together, means electrically connecting said third pair of contacts to the ignition circuit and the second pair of contacts to the battery, said pole in a first position being formed and arranged to bridge said third and second pair of contacts to energize the ignition circuit from the battery, and means electrically connecting said first pair of contacts to the output of the rectifier, said pole in a second position being formed and arranged to bridge said first and third pair of contacts, to energize the ignition circuit from the output of the rectifier, said pole in a third position being formed and arranged to bridge said first and second pair of contacts to charge the battery from the rectifier.

References Cited in the file of this patent

UNITED STATES PATENTS

| | | |
|---|---|---|
| 1,170,275 | Kettering | Feb. 1, 1916 |
| 1,461,234 | Tower | July 10, 1923 |

OTHER REFERENCES

Advertisement of General Electric Battery Chargers in "Farm Implement News"—September 8, 1949, page 21. (Copy in Scientific Library and in Search Room Annex.)